United States Patent [19]

Yamase

[11] Patent Number: 4,877,926
[45] Date of Patent: Oct. 31, 1989

[54] ACTUATOR OF AN AIR CONDITIONER OF A VEHICLE

[75] Inventor: Tokuhiro Yamase, Kosai, Japan

[73] Assignee: Asmo Co., Ltd., Kosai, Japan

[21] Appl. No.: 252,936

[22] Filed: Oct. 4, 1988

[30] Foreign Application Priority Data

Oct. 30, 1987 [JP] Japan .................................. 62-167703

[51] Int. Cl.[4] ...................... H01H 19/00; H01H 3/32
[52] U.S. Cl. ..................................... 200/19 R; 200/24; 200/37 R; 200/501
[58] Field of Search .................. 200/11 DA, 24, 37 R, 200/37 A, 38 R, 61.39, 153 P, 501, 303, 19 R; 57/1 R, 105

[56] References Cited

U.S. PATENT DOCUMENTS

| | | | |
|---|---|---|---|
| 4,197,436 | 4/1980 | Ishikawa et al. | 200/37 R |
| 4,332,129 | 1/1982 | Schipper et al. | 57/105 |
| 4,609,794 | 9/1986 | Porter | 200/24 |
| 4,630,949 | 12/1986 | Boella et al. | 200/11 J |
| 4,795,867 | 1/1989 | Ohi et al. | 200/37 R |

Primary Examiner—J. R. Scott
Attorney, Agent, or Firm—Burns, Doane, Swecker & Mathis

[57] ABSTRACT

An actuator for an air-conditioner for use in a vehicle includes an actuator housing for accommodating a motor, a reduction gear unit and a position-detecting unit. The motor has a shaft extending therefrom with a worm gear fixed to the shaft. The reduction gear unit includes a helical gear that is adapted to engage the worm gear, another gear that supports an output shaft, and a plurality of spur gears positioned between the helical gear and the gear that supports the output shaft. The position-detecting unit includes an output shaft-inserting cylinder which has brushes mounted thereon. The output shaft-inserting cylinder is removably fixed to the output shaft. A printed circuit board having switching patterns thereon that are adapted to engage the brushes and the output shaft-inserting cylinder are mounted at predetermined positions in a position detecting unit housing.

1 Claim, 3 Drawing Sheets

ACTUATOR OF AN AIR CONDITIONER OF A VEHICLE

BACKGROUND OF THE INVENTION

1. Field of the Invention

The present invention relates to an electric actuator, namely, an actuator to be operated by an electric motor adapted for opening and closing a damper of an air conditioner of a vehicle, and more particularly, to an electric actuator which can be easily constructed by combining a motor, a reduction gear unit which transmits the output of the motor to an output shaft adapted for opening or closing the damper, and a position-detecting unit which detect the position of the output shaft so as to control the motor.

2. Description of Related Art

An actuator for controlling the position of a damper provided with an air conditioner for use in a vehicle is proposed. As shown in FIG. 1 an air conditioner includes an air-refreshing (R/F) damper 1, an air-mixing (A/M) damper 2, and an exit change-over (MODE) damper 3. The actuator is provided with a reduction gear mechanism which transmits the rotation of a D.C. motor to an output shaft through which the air-refreshing (R/F) damper 1, the air-mixing (A/M) damper 2, and the exit change-over (MODE) damper 3 are opened or closed. The actuator is further provided with a position-detecting mechanism which includes brushes mounted on the output shaft and a plate carrying switching patterns connected to switches for an air-refreshing (R/F), an air-mixing (A/M), and an exit change-over (MODE) disposed at positions at which the switching patterns and the brushes contact with each other. The above-described mechanism detects the rotation angle of the output shaft so as to control the rotation of the motor. Referring to FIG. 1, the air conditioner includes a blower 4, an evaporator 5, and a heater core 6.

In the above-described known actuator, the reduction gear mechanism comprises a helical gear engaging with a worm gear fixed to the shaft extending from the motor and spur gears disposed between the output shaft and the helical gear. When a gear ratio is changed in this reduction gear mechanism, it is necessary to change the positions of all the spur gears and the gear-supporting shaft. Further, the number of reduction gears is required to change according to reduction gear ratios. It is necessary to change a reduction gear ratio according to a selected switching pattern of the switching patterns for the air-refreshing (R/F), the air-mixing (A/M), and the exit change-over (MODE). This increases the number of works and processes (position-changes of gears and gear-supporting shaft) for constructing the actuator. Furthermore, an erroneous gear may be mounted on the reduction gear mechanism because reduction gear ratios are required to be changed according to switching patterns. Moreover, it is difficult to automatically assemble gears, so that labor-saving cannot be accomplished. This causes the cost for manufacturing an air conditioner to increase. In addition, an air conditioner is required to be accurate in detecting the position of the output shaft and compact. However, a compact air conditioner causes the position-detecting section to be compact, which makes it difficult to mount brushes on the gear fixed to the output shaft and also correctly position the brushes and the plate on which the switching patterns are mounted. It depends on a correct positioning of the brushes and the plate carrying the switching patterns whether or not the damper stops with a high accuracy.

SUMMARY OF THE INVENTION

The present invention has been made with a view to solving the above-described disadvantage and has for its object to provide an actuator, of an air conditioner for use in a vehicle, in which when a reduction gear ratio or a switching pattern is changed, a motor, a reduction gear section, and a position-detecting section are held together at fixed positions, whereby the combination of a reduction gear ratio and a switching pattern can be easily effected. Further, brushes and the switching pattern can be accurately and easily positioned in the position-detecting section and the positioning thereof can be automatically performed, whereby the rotation angle of an output shaft can be detected with a high accuracy and the actuator can be made to be compact and light.

The actuator of an air conditioner for use in a vehicle according to the present invention comprises a motor and a worm gear fixed to the shaft of the motor; a reduction gear unit in which the axis of a helical gear engaging with the worm gear and the axis of a gear fixing an output shaft thereto are mounted at fixed positions of a housing, respectively, and a plurality of spur gears which are provided between the helical gear and the gear fixing the output shaft thereto and provide an appropriate reduction gear ratio; a position-detecting unit, in the housing, in which an output shaft-inserting cylinder removably fixed to the output shaft is mounted at a predetermined position of a housing, brushes are mounted on the output shaft-inserting cylinder, a plate on which switching patterns are provided is mounted at a position at which the brushes contact with the switching patterns, and a connector which supplies the power source and is connected to the switching patterns; a housing for accommodating the motor and the gear fixed to the motor shaft, the reduction gear unit, and the position-detecting unit at predetermined positions, respectively; whereby the position-detecting unit including a certain switching pattern and the reduction gear unit having a certain reduction gear ratio can be held together in the same housing.

BRIEF DESCRIPTION OF THE DRAWINGS

These and other objects and the feature of the present invention will become apparent from the following description taken in conjunction with preferred embodiment thereof with reference to the accompanying drawings, in which.

DETAILED DESCRIPTION OF THE INVENTION

The preferred embodiment of the present invention is described with reference to FIGS. 2 through 6.

Figure 1:
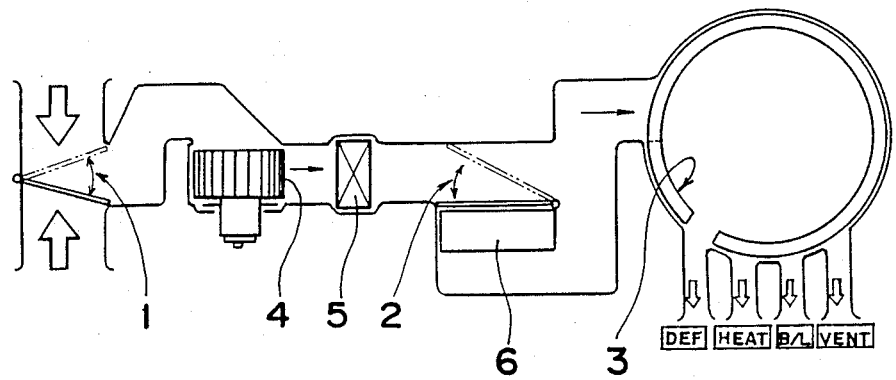
FIG. 1 is a schematic diagram showing an electric actuator for use in, a vehicle.
Figure 2:
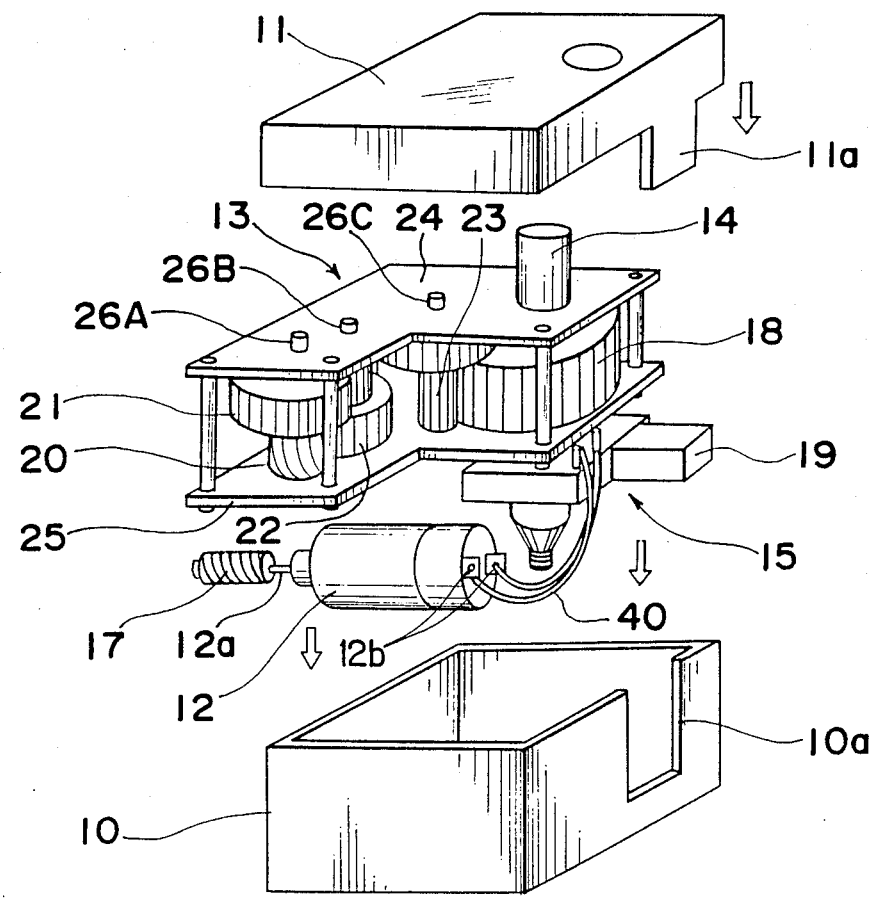
FIG. 2 is a perspective view of an exploded actuator according to the present invention.
Figure 3:
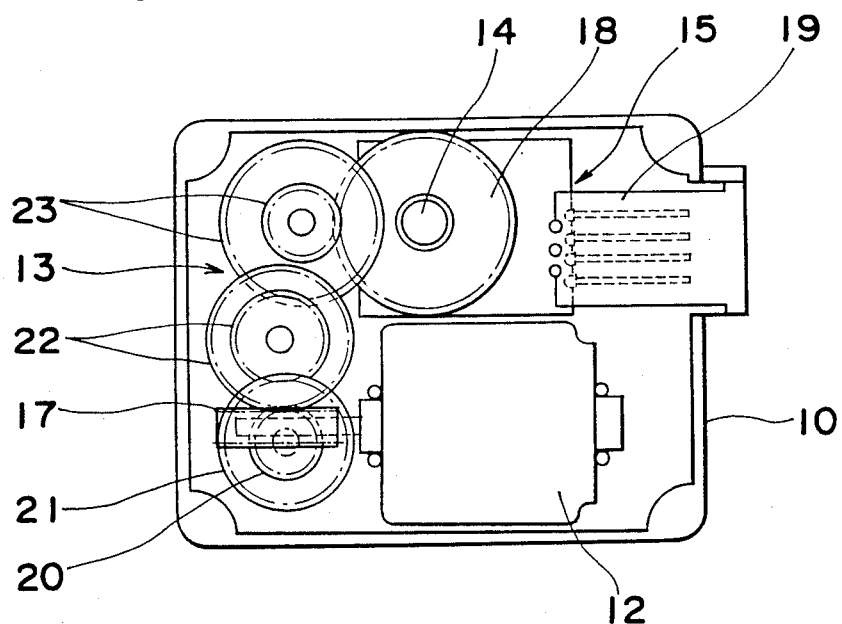
FIG. 3 is a schematic diagram showing the respective mechanisms arranged in a housing.

An actuator according to the present invention comprises an actuator housing 10, a housing cover 11 to be fitted in the upper portion of the actuator housing 10, a motor 12, a reduction gear unit 13, an output shaft 14, a position-detecting unit 15, and a power source-supplying connector 19. As schematically shown in FIG. 3, the motor 12, the reduction gear unit 13, the output shaft 14, and the position-detecting unit 15 are disposed at predetermined positions of the actuator housing 10 even though the gear ratio of the reduction gear unit 13 and a switching pattern are changed. After the motor 12, the reduction gear unit 13, the output shaft 14, and the position-detecting unit 15 are accommodated in the actuator housing 10, they are covered with the housing cover 11. A connector 19 projects outwards from the space between a projection 11a formed on the cover 11 and a cut-out 10a, of the actuator housing 10, in which the projection 11a is fitted.

The motor 12 is disposed at the forward right of the actuator housing 10, and a worm gear 17 is fixed to a motor shaft 12a extending leftwards from the motor 12. The reduction gear unit 13 is disposed at the forward left except the portion at which the motor 12 is disposed and the rear of the actuator housing 10. The output shaft 14 inserted into the axis of the gear 18 is disposed at the forward right of the actuator housing 10. The position-detecting unit 15 projects downwards from the reduction gear unit 13 and is fixed to the output shaft 14 which is, as described above, disposed in the forward right of the actuator housing 10. The position-detecting unit 15 is connected to the connector 19 and the motor 12.

The reduction gear unit 13 comprises a helical gear 20 which engages with the worm gear 17, a spur gear 21 integrated with the helical gear 20, a spur gear 22 engaging with the spur gear 21, a spur gear 23 engaging with the spur gear 22, the gear 18 which fixes the output shaft 14 and engages with the spur gear 23, an upper plate 24 and a lower plate 25, and pins 26A, 26B, 26C which rotatably support the spur gears 20 21, 22, 23, respectively. The upper and lower plates 24, 25 constitute an exemplary gear unit housing. The gears 20 through 23 are rotatably supported by the pins 26A through 26C vertically mounted between the upper plate 24 and the lower plate 25. The output shaft 14 supported by the gear 18 is rotatable and projects upwards from the opening formed on the plate 24 and downwards from the opening formed on the plate 25. Irrespective of reduction gear ratios and the number of gears mounted on the reduction gear unit 13, the helical gear 20 which engages with the worm gear 17 fixed to the shaft extending from the motor 12 and the output shaft 14 to be removably mounted on the position-detecting unit 15 are mounted on predetermined positions of the housing 10. Further, the reduction gear units 13 are identical to each other in the external configurations thereof and mounted at a predetermined position of the actuator housing 10.

In other words, provided that the helical gear 20 and the output shaft 14 are mounted on the predetermined positions of the actuator housing 10 and the outer configurations of the reduction gear units 13 are identical, the standardization of the reduction gear units 13 can be facilitated and the reduction gear units 13 can be automatically mounted in the same housing 10 by preparing the reduction gear units 13 having various reduction gear ratios and various numbers of gears.

Figure 4:
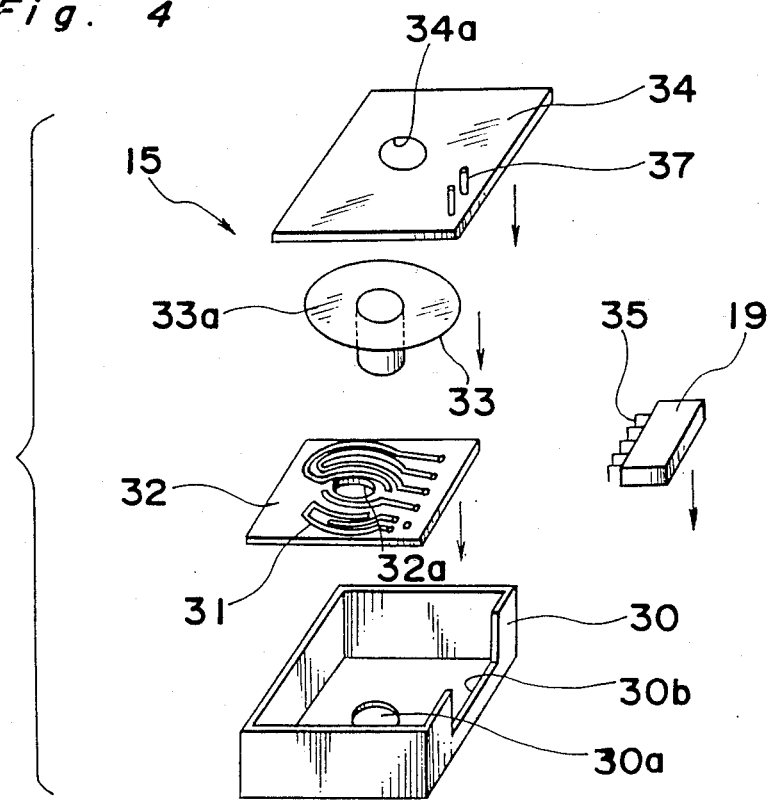
FIG. 4 is a perspective view of an exploded position-detecting unit.
Figure 5:
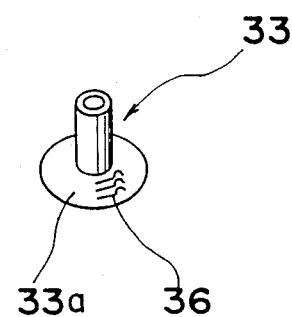
FIG. 5 is a perspective view showing a brush mounted on an output shaft-inserting cylinder.
Figure 6:
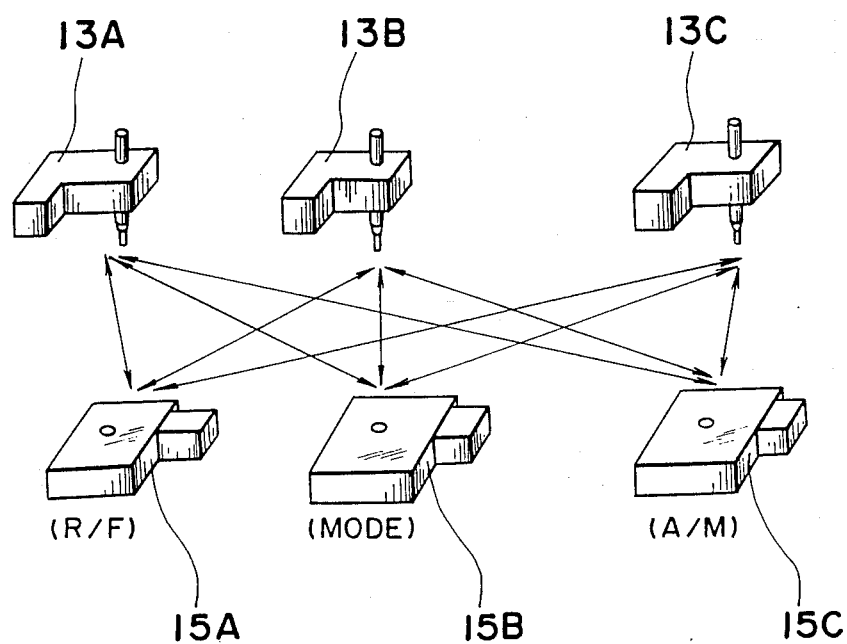
FIG. 6 is view showing examples of the combinations of reduction gear units and position-detecting units in which various switching patterns are mounted.

As shown in FIG. 4, the position-detecting unit 15 to be fixed to the output shaft 14 extending through the reduction gear unit 13 comprises a position-detecting housing case 30, a plate 32 on which switching patterns 31 are mounted, an output shaft-inserting cylinder 33, a housing cover 34, and the connector 19 which supplies the power source. Openings 34a, 32a, and 30a through which the output shaft 14 rotatably extends are formed on the centers of the housing cover 34, the plate 32, and the housing case 30, respectively. The output shaft 14 is inserted into the opening 34a of the housing cover 34, and fixedly inserted into the output shaft-inserting cylinder 33, and then, rotatably inserted through the openings 32a of the plate 32 and the opening 30a of the housing case 30. A flange 33a rotatably fixed to the output shaft 14 is formed on the output shaft-inserting cylinder 33 disposed between the housing case 30 and the housing cover 34. As shown in FIG. 5, brushes 36 are mounted on the bottom face of the flange 33a. The plate 32 is fixed to the housing case 30 so that the brushes 36 contact with the switching patterns 31 mounted on the plate 32. The connector 19 is mounted on a connector-mounting cut-out 30b formed on the housing case 30. The connection terminals 35 of the connector 19 are connected to the respective input terminals of the switching patterns 31. The output terminals of the switching patterns 31 are connected to terminals 37 which are mounted on the housing cover 34 and supply the power source to the motor 12. The terminals 37 are connected to the input terminals 12b through a lead wire 40. The respective position-detecting units 15 comprising the housing case 30, the housing cover 34, and the connector 19 are identical to each other in the external configurations thereof, and mounted on the predetermined position of the housing 10, and fixed to the output shaft 14 at the predetermined position thereof. Therefore, the position-detecting units 15 can be easily standardized even though the plates 32 on which the switching patterns 31 (for air-refreshing (R/F), air-mixing (A/M), exit change-over (MODE)) and the output shaft-inserting cylinders 33 provided with the brushes 36 which contact with the switching patterns 31 are mounted thereon. To this end, position-detecting units 15 (for air refreshing (R/F), air-mixing (A/M), and exit change-over (MODE)) in which the brushes 36 and the plates carrying the switching patterns 31 are held together are prepared so that the position-detecting units 15 are exchangeable and easily automatically mounted on the housing 10.

The method for constructing the actuator comprising the above-described units is described hereinbelow. First, the motor 12 connected with the worm gear 17, the reduction gear unit 13, and the position-detecting unit 15 are mounted at predetermined positions of the housing 10. Thereafter, the housing cover 11 is fitted in the housing 10. When the gear ratio of the reduction gear unit 13 or the switching patterns 31 provided with the position-detecting unit 15 is changed, the reduction gear unit 13 and the position-detecting unit 15 which have been used are removed from the housing 10, and thereafter, desired ones are mounted in the housing 10. As shown by arrows in FIG. 6, it is possible to combine any one of the reduction gear units 13A whose gear ratio is (a), 13B whose gear ratio is (b), and 13C whose gear ratio is (c) with any one of the position-detecting units 15A for the air-refreshing (R/F), 15B for the exit change-over (MODE), and 15C for the air-mixing (A/M).

In the above-described actuator, when the motor 12 rotates by the supply of electric current, the worm gear 17 engages with the helical gear 20 of the reduction gear unit 13. Thus, the rotation of the motor 12 is transmitted to the reduction gear unit 13. As a result, the gear 18 rotates at a predetermined reduction gear ratio. This causes the output shaft 14 to be rotated. The rotation of the output shaft 14 leads to the openings or closings of the dampers for the air-refreshing (R/F), the exit change-over (MODE), and the air-mixing (A/M). In unison with the rotation of the output shaft 14, the brushes 36 of the position-detecting unit 15 rotate in contact with the switching patterns 31 mounted on the plate 32. When the brushes 36 reach the edge of one of the switching patterns 31, electric current does not flow through the position-detecting unit 15. As a result, the rotation of the motor 12 connected to the position-detecting unit is stopped. Consequently, the dampers are stopped at predetermined positions.

As is apparent from the foregoing description, in the actuator of an air conditioner of a vehicle, the position-detecting section and the reduction gear section except the motor and the worm gear fixed to the motor shaft are constructed as one unit, respectively before these sections are mounted on the housing 10. Further, the reduction gear unit, the position-detecting unit, and the unit including the motor and the worm gear fixed to the motor shaft are mounted at predetermined positions of the housing, respectively, which facilitates the operation of mounting these units on the housing, i.e, they are automatically mounted on the housing. In addition, the external configurations of the reduction gear units are identical to each other, and the helical gear engaging with the worm gear and the output shaft are mounted at predetermined positions of the reduction gear unit. Therefore, the reduction gear units can be easily standardized by preparing reduction gear units having different numbers of gears mounted between the helical gear and the output shaft to which the position detecting unit is fixed and different reduction gear ratios. Accordingly, the actuator in accordance with the magnitudes of loads to be imparted on the respective dampers can be manufactured, i.e., the actuator can be applied to a wide range. Furthermore, the external configurations of the position-detecting units are identical to each other. Therefore, the external configurations of units constituted by fixing the position-detecting unit to the reduction gear unit are identical to each other. That is, the reduction gear unit having a certain gear ratio can be combined with the position-detecting unit having a certain switching pattern for the air-refreshing (R/F), the exit change-over (MODE), or the air-mixing (A/M). Thus, any desired combination of both units can be selected, i.e., the exchange of switching patterns can be easily made. Moreover, since the brushes are so positioned that they contact with the switching patterns, the dampers stop at predetermined positions with a high accuracy. The failures of the reduction gear unit and the position-detecting unit can be examined before the latter is mounted on the former. Accordingly, failures very rarely occur after both are held together. Even though failures take place before they are held together, they can be easily disassembled so that the failures are corrected. Thus, the actuator according to the present invention has a lot of advantages.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An actuator of an air conditioner for use in a vehicle comprising:

a motor having a shaft extending therefrom and a worm gear fixed to the shaft;

a reduction gear unit including a helical gear which engages said worm gear and another gear that supports an output shaft, said helical gear and said gear that supports the output shaft being mounted at fixed positions on a gear unit housing, said reduction unit also including a plurality of spur gears which are mounted on the gear unit housing between said helical gear and said gear that supports the output shaft in order to transmit rotational movement of the motor to the output shaft through an appropriate reduction gear ratio;

a position-detecting unit including an output shaft-inserting cylinder having brushes mounted thereon and being removably fixed to said output shaft and being mounted at a predetermined position of a position-detecting unit housing, a printed circuit board mounted at a position on the position-detecting unit housing so that the brushes located on said output shaft-inserting cylinder contact switching patterns on the printed circuit board, and a connector which is connected to the printed circuit board for supplying power; and an actuator housing for accommodating said motor and said gear, said reduction gear unit, and said position-detecting unit at predetermined positions; whereby said position-detecting unit including a certain switching pattern and the reduction gear unit having a certain reduction gear ratio can be held together in the actuator housing.

* * * * *